United States Patent
Svedman

(10) Patent No.: US 9,603,026 B2
(45) Date of Patent: Mar. 21, 2017

(54) DYNAMIC TRANSMISSION ANTENNA RECONFIGURATION IN WIRELESS NETWORKS

(71) Applicant: ZTE Wistron Telecom AB, Stockholm (SE)

(72) Inventor: Patrick Svedman, Stockholm (SE)

(73) Assignee: ZTE Wistron Telecom AB, Stockholm (SE)

(*) Notice: Subject to any disclaimer, the term of this patent is extended or adjusted under 35 U.S.C. 154(b) by 35 days.

(21) Appl. No.: 14/433,158

(22) PCT Filed: Oct. 3, 2013

(86) PCT No.: PCT/IB2013/003039
§ 371 (c)(1),
(2) Date: Apr. 2, 2015

(87) PCT Pub. No.: WO2014/096955
PCT Pub. Date: Jun. 26, 2014

(65) Prior Publication Data
US 2015/0281973 A1   Oct. 1, 2015

Related U.S. Application Data

(60) Provisional application No. 61/744,891, filed on Oct. 3, 2012.

(51) Int. Cl.
*H04Q 7/10* (2006.01)
*H04W 16/14* (2009.01)
(Continued)

(52) U.S. Cl.
CPC .............. *H04W 16/14* (2013.01); *H04B 7/04* (2013.01); *H04B 7/0691* (2013.01);
(Continued)

(58) Field of Classification Search
CPC ..... H04W 36/04; H04W 36/22; H04W 16/14; H04W 48/12; H04W 72/042;
(Continued)

(56) References Cited

U.S. PATENT DOCUMENTS

| 2010/0056177 A1* | 3/2010 | Kojima | H04W 64/00 455/456.1 |
| 2010/0167728 A1* | 7/2010 | Venkitaraman | H04W 36/04 455/434 |

(Continued)

FOREIGN PATENT DOCUMENTS

WO   2010/128910 A1   11/2010

OTHER PUBLICATIONS

Ericsson, ST-Ericsson, "Discussion on design principles for additional carrier types," 3GPP TSG RAN WG1 Meeting #66bis, R1-112925, Zhuhai, China, 5 pages, Oct. 2011.

(Continued)

*Primary Examiner* — Kathy Wang-Hurst
*Assistant Examiner* — Julio Perez
(74) *Attorney, Agent, or Firm* — Perkins Coie LLP

(57) ABSTRACT

A wireless communication technique includes configuring a first antenna group to transmit common system information, a common reference signal, and data according to a first format and a second format to wireless devices in a cell, configuring a second antenna group to transmit data according to the second format, but no common system information or common reference signals, to wireless devices in the cell and dynamically assigning, based on a network operational status, antennas from a plurality of antennas to either the first antenna group or the second antenna group.

10 Claims, 7 Drawing Sheets

(51) Int. Cl.
  *H04B 7/06* (2006.01)
  *H04B 7/08* (2006.01)
  *H04W 48/12* (2009.01)
  *H04B 7/04* (2006.01)
  *H04W 16/32* (2009.01)
  *H04W 72/04* (2009.01)
  *H04W 48/10* (2009.01)
  *H04W 48/20* (2009.01)
  *H04W 84/04* (2009.01)
  *H04L 5/00* (2006.01)

(52) U.S. Cl.
  CPC ......... *H04B 7/0874* (2013.01); *H04L 5/0048* (2013.01); *H04W 16/32* (2013.01); *H04W 48/12* (2013.01); *H04W 72/042* (2013.01); *H04W 72/0453* (2013.01); *H04L 5/005* (2013.01); *H04L 5/0023* (2013.01); *H04W 48/10* (2013.01); *H04W 48/20* (2013.01); *H04W 84/045* (2013.01)

(58) Field of Classification Search
  CPC . H04W 72/0453; H04W 48/10; H04W 48/20; H04W 84/045; H04B 7/04; H04B 7/0691; H04L 5/0023; H04L 5/005
  USPC .............................. 455/410, 434, 444, 456.1
  See application file for complete search history.

(56) References Cited

U.S. PATENT DOCUMENTS

| 2011/0141927 | A1* | 6/2011 | Luo ................. H04L 25/03343 370/252 |
| 2011/0171985 | A1* | 7/2011 | Papasakellariou .... H04W 72/02 455/509 |
| 2013/0005388 | A1* | 1/2013 | Naka .................. H04W 52/244 455/522 |
| 2013/0258868 | A1* | 10/2013 | Davis .................. H04B 7/0689 370/252 |
| 2014/0097986 | A1* | 4/2014 | Xue ........................ H01Q 3/34 342/372 |

OTHER PUBLICATIONS

Ericsson, ST-Ericsson, "Main scenarios and use cases for additional carrier types," 3GPP TSG RAN WG1 Meeting #68bis, R1-121792, Jeju, Korea, 4 pages, Mar. 2012.
International Search Report mailed on Jun. 4, 2014 for International Application No. PCT/IB2013/003039, filed Oct. 3, 2013 (4 pages).
LG Electronics, "Discussions on synchronized new carrier type," 3GPP TSG RAN WG1 Meeting #69, R1-122276, Prague, Czech Republic, 4 pages, May 2012.
NTT DOCOMO, "Investigation of Cell Aggregation for Rel. 11 CoMP," 3GPP TSG RAN WG1 Meeting #67, R1-114077, San Francisco, USA, 4 pages, Nov. 2011.

* cited by examiner

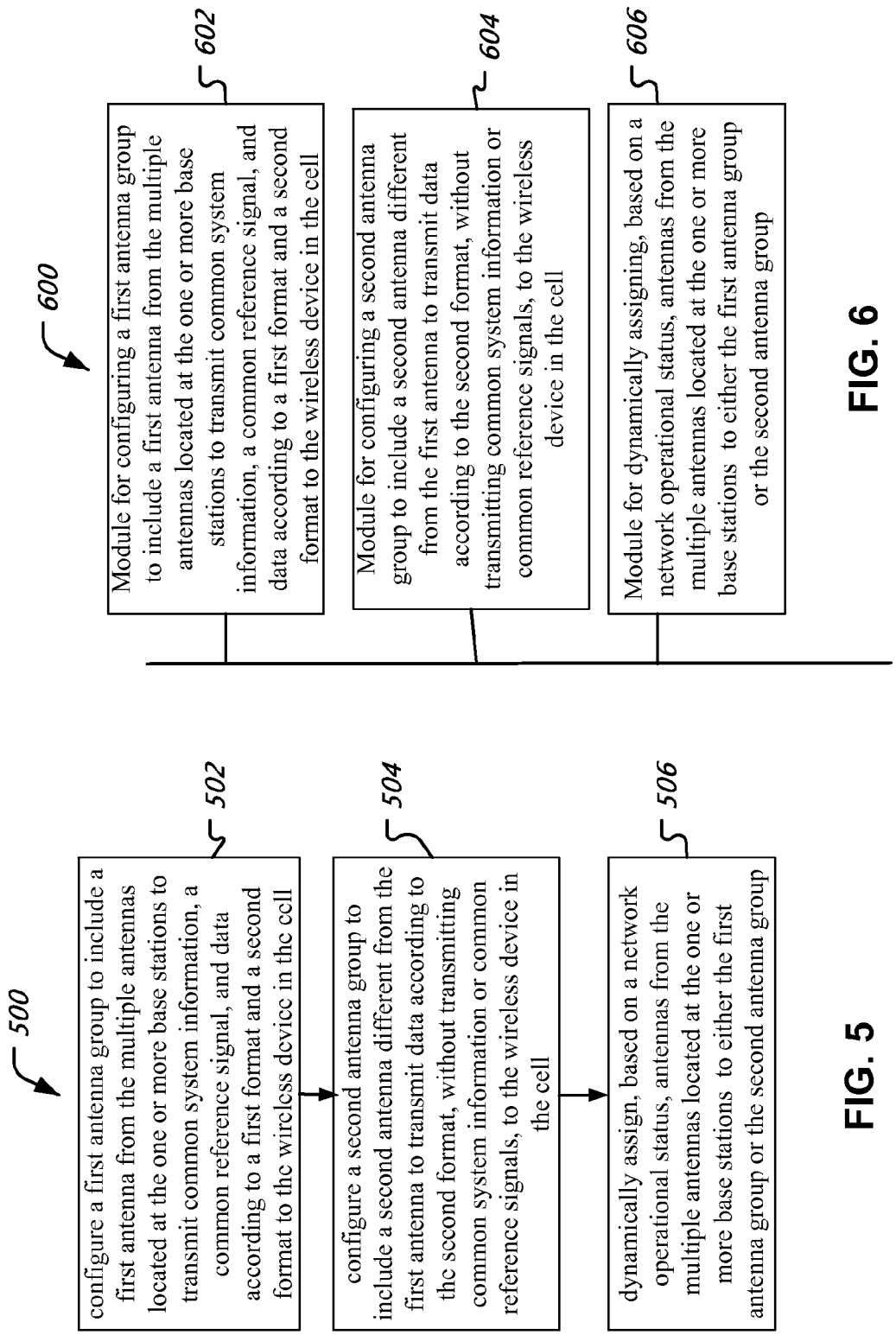

DYNAMIC TRANSMISSION ANTENNA RECONFIGURATION IN WIRELESS NETWORKS

CROSS REFERENCE TO RELATED APPLICATIONS

This patent document claims the benefit of priority of U.S. Provisional Patent Application No. 61/744,891, filed on Oct. 3, 2012, entitled "Dynamic Transmission Antenna Reconfiguration in Wireless Networks." The entire content of the before-mentioned patent application is incorporated by reference as part of the disclosure of this application.

BACKGROUND

This document relates to cellular telecommunication systems, including heterogeneous networks where one or more low-power nodes are deployed at least partially within the coverage area of a macro base station.

Cellular communication systems are being deployed all over the world to provide voice services, mobile broadband data services and multimedia services. There is a growing need for cellular bandwidth due to various factors, including the continuous increase in the number of mobile phones such as smartphones that are coming on line and deployment of new mobile applications that consume large amounts of data, e.g., mobile applications in connection with video and graphics. As mobile system operators add new mobile devices to the network, deploy new mobile applications and increase the geographic areas covered by broadband mobile services, there is an ongoing need to cover the operator's coverage area with high bandwidth connectivity.

SUMMARY

The available cellular bandwidth for data communication in a given coverage area can be increased by a number of techniques, including improving the spectrum efficiency for the point-to-point link and splitting communication cells into smaller cells. In cell splitting, when the split cells become small and close to one another, the adjacent cell interferences can become significant and may lead to the cell splitting gain saturation as the number of split cells in a given area increases to above a certain number. Furthermore, nowadays it is increasingly difficult to acquire new sites to install base stations and the costs for adding new base stations are increasing. These and other factors render it difficult to use cell-splitting to fulfill the increasing bandwidth demands.

This document describes technologies, among other things, for enabling the use of multiple transmit antennas for downlink transmissions to user equipment (UE) in the wireless coverage area of a cell.

In one aspect, transmissions points are dynamically assigned, based on network operation status, to two different logical antenna groups. Antennas in the first group are used to transmit common system information and a common reference signal to wireless devices operating in the cell. Antennas in the first group are also configured to transmit data according to two different data formats: a first format and a second format. Antennas in the second group are configured to transmit data according to the second format only, and not transmit data according to the first format or the common reference signal or the common system information. Antennas from the plurality of antennas available for downlink transmissions are dynamically assigned to either the first antenna group or the second antenna group based on the network operational status.

These and other aspects, and their implementations and variations are set forth in the drawings, the description and the claims.

BRIEF DESCRIPTION OF THE DRAWINGS

FIG. 5 is a flow chart representation of a process for wireless communications.

FIG. 6 is a block diagram representation of a wireless network apparatus.

Like reference symbols in the various drawings indicate like elements.

DETAILED DESCRIPTION

Figure 1:
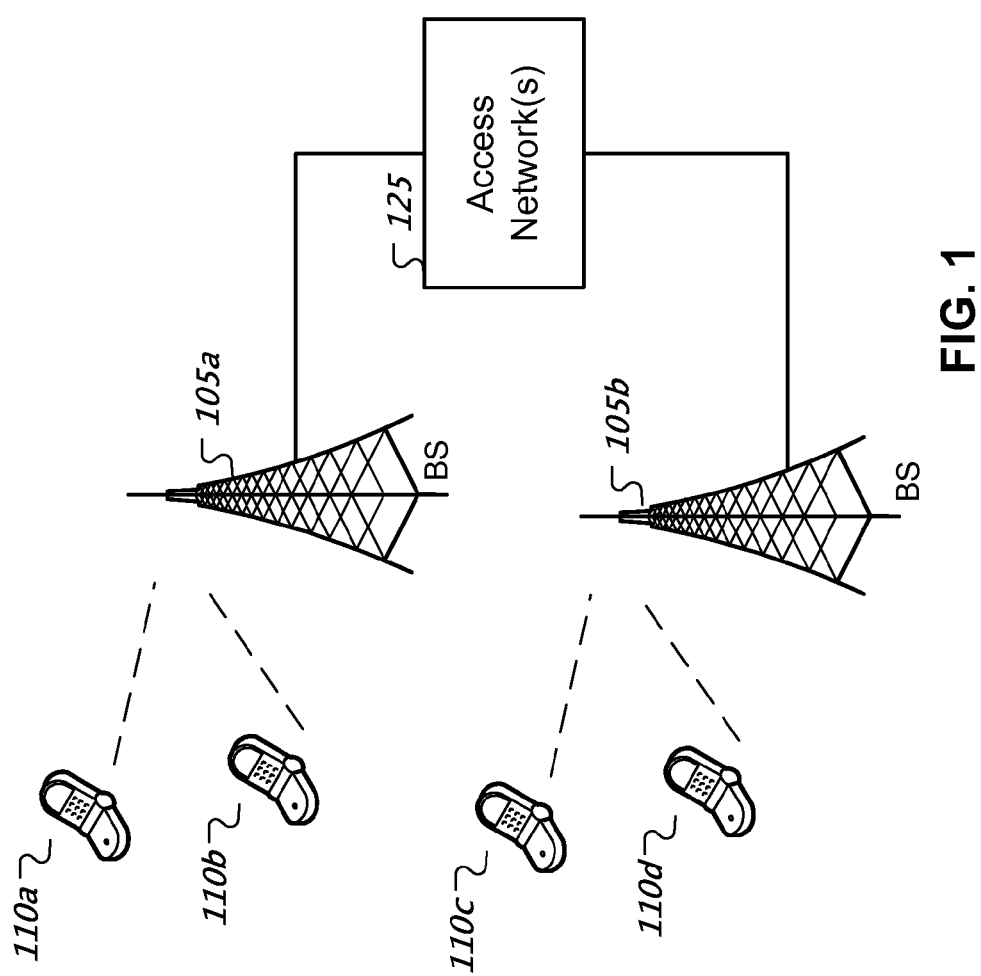
FIG. 1 depicts a wireless network configuration.

The techniques described in this document are applicable to a wireless network serving one or more user equipment (UE) devices, such as a mobile phone or a wireless communication device including a tablet or laptop computer. The wireless network can be a heterogeneous network (HetNet) deployment having multiple tiers of communication nodes/base stations such as macro base stations and micro base stations. A macro base station in such a HetNet has sufficiently high transmission power to cover a large macro cell area while a micro base station is a low power node (LPN) that covers a smaller area that is either within or partially within the larger macro cell area of a macro base station.

To meet the ever-increasing demand for bandwidth, various wireless communication networks have begun using configurations in which network transmission devices such as base stations are equipped with multiple transmission or reception antennas. Furthermore, heterogeneous network configurations are increasingly used in some deployments in which one or more micro base stations operate at low power levels to provide coverage to a smaller geographic area, e.g., customer premises, under control of one or more macro base stations that operate at high power levels. When a micro base station is under the control of the network, the transmission resources of the micro base station (e.g., physical antennas at the micro base station) also add to a network's available resources of possible downlink transmission points to serve data to a wireless device. In some implementations, the micro base station may be a femto cell base station. In some implementations, from a wireless device's perspective, transmissions from a macro or a micro base station can appear to belong to the same cell because they carry the same cell ID.

It may be beneficial for the network to select transmission points for downlink data transmissions to a particular user equipment (UE), such that the antenna or antennas that are most suitable are used, regardless of whether these antennas are physically at the micro base station or the macro base station.

Various existing wireless networks are not designed to perform such a dynamic antenna assignment. Such wireless networks tend to pre-assign transmission antenna resources (e.g., physical antennas) for downlink transmission. In addition, many UE devices presently in operation are designed to need the downlink data to be transmitted from the same antennas from which common reference signal for channel estimation are transmitted. This operational limitation on the UE side hampers the ability of various existing wireless networks to accommodate newer UEs that can also operate in a mode in which UE-specific reference signals are used for calibrating a downlink channel to the UE, and therefore such newer UEs do not limit the network to tie together data transmissions and common reference signal transmissions from the same physical antennas.

In another operational example, if a micro base station is experiencing bandwidth congestion, it may be beneficial for the network to dynamically reconfigure downlink data transmission responsibilities between micro and macro base station to increase the number of UEs that are served simultaneously. However, due to the aforementioned limitations, some existing wireless networks are limited in their ability to dynamically reconfigure transmit antennas from the macro or micro base stations to serve different revisions of UEs.

In many cellular systems, a UE can acquire various network parameters and settings of the serving network and of the cell currently serving the UE based on broadcasted common information blocks by the network. These common information blocks broadcasted by the network can be periodically broadcasted by the cellular network nodes. The broadcasted information applies to all UEs in the cell or in a process of joining the cell. Such broadcasted information is usually different in different cells. Many of such networks use coherent communication for these common information blocks. Under such coherent communication operations, a UE needs to receive a certain known reference (pilot) signal together with the broadcasted information blocks in order to properly establish communications with the cell or network.

In this document, this reference or pilot signal is referred to as the common reference signal. The common channel comprising the broadcasted information blocks is referred to as the broadcast channel. In the examples provided below, the common reference signal is transmitted from the same set of antennas as the broadcast channel. A UE also acquires information on the relation between the mapping of the modulated symbols of the broadcast channel to the set of antennas and the mapping of the common reference signal symbols to the set of antennas. These typically linear mappings are often called precoding. The precoding operation can include antenna subset selection from the set of antennas used by the common reference signal.

The common reference signal used for the reception of the broadcast channel may be also used for other functions, such as power measurements for UE mobility and channel quality estimation. Hence, the common reference signal, as well as the broadcast channel, may need to be transmitted by a base station in the network on a regular basis in order to provide coverage without interruption.

UE-dedicated control and data coherent transmission to the UE can typically be performed with the assistance of the common reference signal. The term "UE-dedicated," in one aspect, means that the transmission is intended to be received by one specific UE.

Another way for the network to communicate UE-dedicated control and data coherently is to use another reference signal that is different from the common reference signal. This additional reference signal is referred to as a dedicated reference signal because, different from the common reference signal that is broadcast to be decoded and used by all UEs, this dedicated reference signal is dedicated by the serving base station to a particular UE for use by that particular UE. Another UE in the coverage area of the same serving base station, although being able to receive the dedicated reference signal, does not use such dedicated reference signal intended for a different UE. The network can implement this dedicated reference signal intended for a specific UE by different ways, including using a dedicated time/frequency assignment for transmission to the specific UE. The time-frequency resources used for transmission to a UE may be implicitly or explicitly scheduled. In some implementations, the dedicated reference signal may be transmitted using transmission parameters such as modulation constellation or precoding that is specific to the UE. Only the UE intended by the network for receiving the dedicated control or data actually processes and uses the dedicated reference signal.

One of advantages of using such a dedicated reference signal is that an arbitrary precoding could be used that is unknown to the receiving UE. The coherent reception could still work if the same unknown precoding is applied to both dedicated reference signal and information symbols. In this way, a precoding that is particularly suitable for the receiving UE can be selected by the base station transmitter, without the need to inform the receiving UE about this. The precoding operation is transparent to the UE in this case. In some implementations, the transmission parameters of the dedicated reference signal and the dedicated control or data transmission may depend on the cell-id while in other implementations, the transmission parameters of the dedicated reference signal and the dedicated control or data transmission may not depend on the cell-id.

The scheme described above relates to one carrier, since typically one carrier corresponds to one cell with its own cell-id. However, the scheme can be extended to multiple carriers that are aggregated into an aggregate with a cell-id.

In general, different UEs deployed in a wireless network may have different capabilities. Some UEs, including certain "legacy" UEs, may be capable of receiving downlink dedicated data and control communication based only on common reference signals. Other UEs may be capable of receiving downlink dedicated data and control communication based only on dedicated reference signals. Yet other UEs may be capable of using both common and dedicated signals for receiving downlink dedicated data and control communication.

As a specific example, in Long Term Evolution (LTE) and LTE-Advanced networks (henceforth called LTE) user equipment can detect the LTE network by searching for the primary synchronization signal (PSS) and secondary synchronization signal (SSS), which are periodically transmitted by an LTE macro base station called eNodeB (eNB). The eNB is an example of a cellular network node in this document. From the detection of PSS/SSS, the UE can also acquire the cell identity number (cell-id). After detection of PSS/SSS, the UE can receive the Master Information Block (MIB), which is transmitted on the Physical Broadcast Channel (PBCH) and the set of System Information Blocks (SIBs), which are transmitted on the Physical Downlink Shared Channel (PDSCH). These blocks contain common information (e.g., system bandwidth) that is useful for a UE to function in the LTE cell. These information blocks are usually periodically broadcasted in the cell.

In performing demodulation of the MIB and the SIBs, the UE also attempts to receive the cell-specific reference signal (CRS). The MIB and the SIBs are transmitted using a precoding that is known to the UE. Often, the precoding of the MIB is not entirely known by the UE. The MIB can be precoded in one of a number of ways. The UE can assume that the precoding that results in a successful reception (decoding resulting with CRC okay) of the MIB was used at the transmitter. The CRS in LTE is an example of what was called a common reference signal in this document. In LTE, the demodulation of downlink control and data symbols (by a UE) can be based on either CRS (called transmission mode 1-6) or UE-specific reference signals, also called demodulation RS or DM-RS (called transmission mode 7-9). UE-specific reference signals or DM-RS in LTE is an example of dedicated reference signal (in contrast with common reference signal). In LTE, UEs under LTE Release-8/9 rely on CRS while UEs under LTE Release 10 can operate using either CRS or DM-RS.

For CRS-based communication, a base station transmits the information symbols from a set of antennas from which CRS signals are also transmitted. In addition, the base station also transmits the relation between the precoding of the CRS and the precoding of the control and data symbols to the UE. Note that the precoding of the CRS needs to be a priori known, since such precoding is used for receiving the broadcasted information blocks.

For demodulation reference signal (DM-RS) based communication, the relation between the precoding of the DM-RS symbols and the precoding of the information symbols is a priori known by the receiving UE. The precoding itself is not known or needed by the receiving UE.

It is noted that LTE also uses the term antenna port where an antenna port can be mapped to a multitude of antennas. For example, the CRS and broadcast channel in LTE can transmitted through two antenna ports, but eight antennas. The mapping from antenna port to antenna is transparent to the UEs.

FIG. 1 shows an example of a wireless communication system to which the described communication techniques are applicable. A wireless communication system can include one or more base stations (BSs) 105a, 105b, one or more wireless devices 110 and an access network 125. Base station 105a, 105b can provide wireless service to wireless devices, or UEs, 110 in one or more wireless sectors. In some implementations, a base station (e.g., 105a or 105b) includes directional antennas to produce two or more directional beams to provide wireless coverage in different sectors.

The access network 125 can communicate with one or more base stations 105a, 105b. In some implementations, the access network 125 includes one or more base stations 105a, 105b. In some implementations, the access network 125 is in communication with a core network (not shown in FIG. 1) that provides connectivity with other wireless communication systems and wired communication systems. The core network may include one or more service subscription databases to store information related to the subscribed UEs 110 (shown as 110a, 110b, 110c and 110c). A first base station 105a can provide wireless service based on a first radio access technology, whereas a second base station 105a can provide wireless service based on a second radio access technology. The base stations 105a may be co-located or may be separately installed in the field according to the deployment scenario. The access network 125 can support multiple different radio access technologies.

Various examples of wireless communication systems and access networks that can implement the present techniques and systems include, among others, wireless communication systems based Code Division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), Evolved UTRAN (E-UTRAN), Long-Term Evolution (LTE). In some implementations, a wireless communication system can include multiple networks using different wireless technologies. A dual-mode or multi-mode wireless device includes two or more wireless technologies that could be used to connect to different wireless networks. In some implementations, a wireless device can support Simultaneous Voice-Data Operation (SV-DO). For CDMA200 systems, the core network 125 can include, among others, mobile switching center (MSC), Packet Data Serving Node (PDSN) and others.

Figure 2:
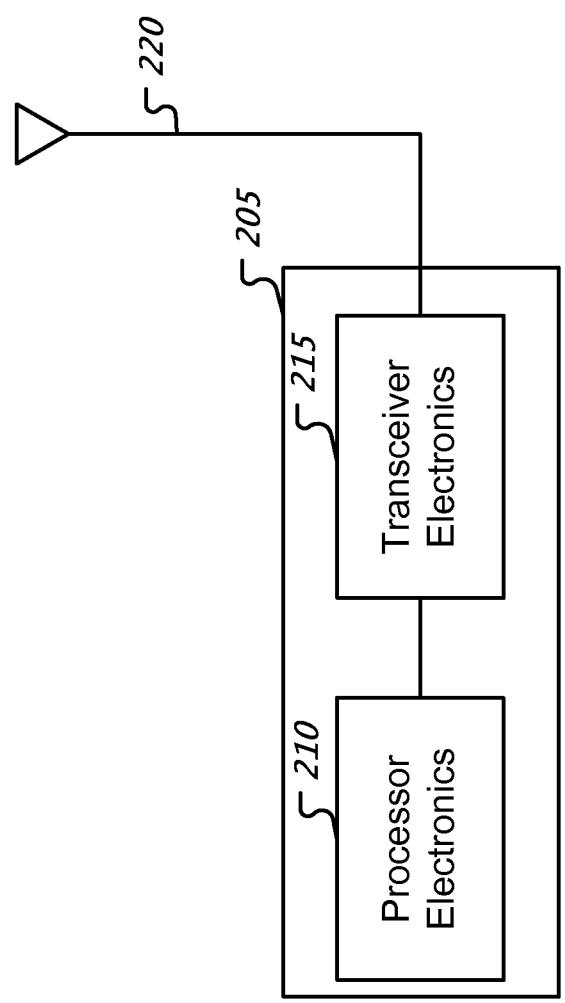
FIG. 2 depicts a radio station architecture.

FIG. 2 is a block diagram representation of a portion of a radio station 205. The radio station 205 represents the some modules for a radio transceiver such as a base station, a wireless device or UE. In this example, the radio station includes processor electronics 210 such as a microprocessor that implements one or more of the wireless communications techniques presented in this document. The radio station 205 can include transceiver electronics 215 to send and/or receive wireless signals over one or more communication interfaces such as antenna 220. The radio station 205 can include other communication interfaces for transmitting and receiving data. Radio station 205 can include one or more memories configured to store information such as data and/or instructions. In some implementations, the processor electronics 210 can include at least a portion of the transceiver electronics 215. While in FIG. 2, for simplicity, antenna 220 is depicted as a single element. However, in some configurations, the radio station 205 may comprises multiple antennae, as further described in this document.

In some implementations, radio stations 205 can communicate with each other based on a CDMA air interface. In some implementations, radio stations 205 can communicate with each other based on an orthogonal frequency-division multiplexing (OFDM) air interface which can include Orthogonal Frequency-Division Multiple Access (OFDMA) air interface. In some implementations, radio stations 205 can communicate using one or more wireless technologies such as CDMA such as CDMA2000 1x, HRPD, WiMAX, LTE, and Universal Mobile Telecommunications System (UMTS).

In many cellular radio systems, the cells are distinguished from the user equipment point of view by cell identity numbers (cell-ids). The cell-id is often reflected in different (typically physical layer) transmission characteristics for different cell-ids. Some such examples include, reference signal sequences, scrambling sequences, synchronization signal properties, and so on. A UE can detect the identity of the cell it is in from certain estimated physical layer parameters and subsequently learn other (primarily physical layer) properties from the detected cell-id.

As used in this document, a cellular network node is a logical node that transmits signals and channels relating to one cell, i.e. one cell-id. In an implementation, it may include baseband and radio units as well as feeders and antennas. In an implementation, the node may be implemented in one radio base station.

As previously discussed, in LTE, for example, some UEs are capable only of CRS-based downlink communication. Other UEs are also capable of DM-RS based downlink communication.

According to one aspect of the present document, the transmit antennas of a cellular network node are logically separated into two or more disjoint sets. In the case of grouping into two logical groups, antenna set A and antenna set B. The antennas in set A are used to transmit the common reference signal and the broadcast channel, whereas the antennas in set B are not used for this purpose. The antennas in set B may still be used for downlink data communication with UEs within the cell.

To address the above-discussed problems related to providing greater data bandwidth to UEs in the network, in one aspect, from among all antennas available to a network for downlink data transmissions to UEs, antennas can be dynamically switched (or configured) to belong to set A or set B or be turned off completely. As further discussed below, this switching may be triggered by changes in the cellular network situation, for example cell load or capabilities of UEs in the cell.

Figure 3A:
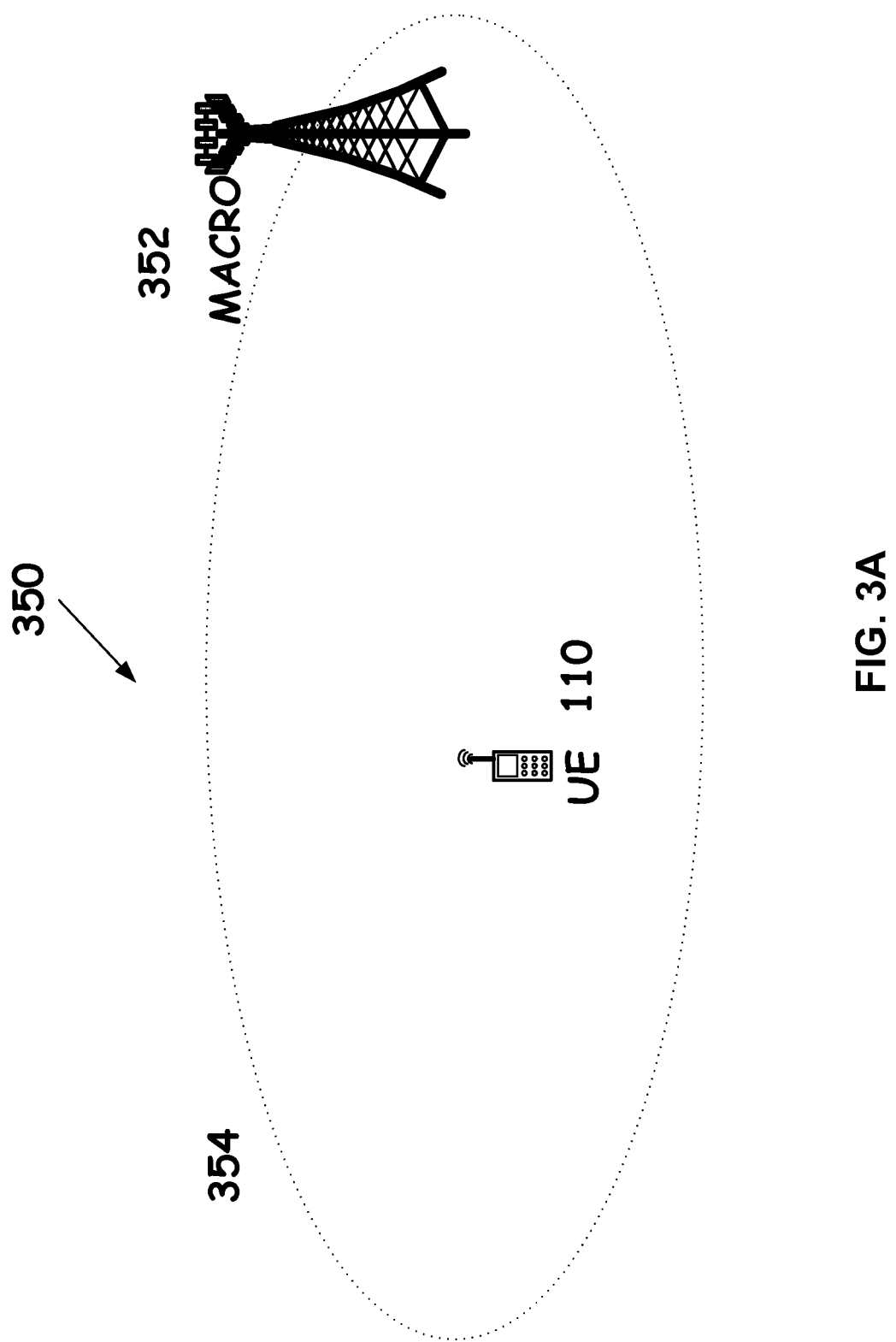
FIG. 3A depicts a cellular network that includes a macro base station.

FIG. 3A depicts an example of a wireless network 350 that includes a macro base station 352, providing wireless services to a UE 110 within a macrocell coverage area 354. The wireless network may include multiple macro base stations 352 providing coverage to corresponding macrocells areas. Within a given cell 354, downlink transmissions point are all located at the macro base station 352. The wireless network 350 may represent, e.g., legacy LTE networks (e.g., Release-8 of LTE or before). In some implementations, because all transmission antennas for a cell are at the same location of the macro base station 352, the wireless network 350 may use the above-discussed common reference signal for sending data transmissions to the UE 110. Hence, a legacy UE 110 may be built to operate in this wireless network 350 where a cell is served by a single macro base station 350. Newer UEs may either have to operate in a 'backward compatible" mode and use only common reference signals. Alternatively, to support UEs 110 that cannot use common reference signal based data communications, the macro base station 352 may need to use dedicated reference signals, as previously discussed.

Figure 3B:
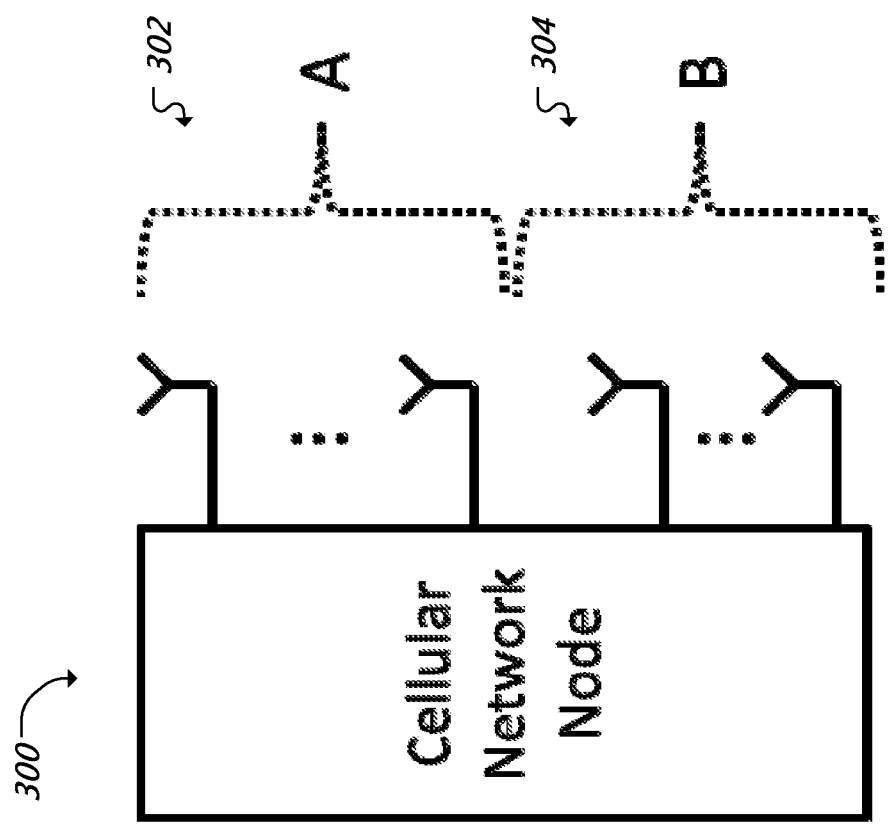
FIG. 3B is a block diagram of a cellular network node comprising multiple antennas.

FIG. 3B illustrates antenna sets of a cellular network node 300. In some implementations, the network node may be similar to the macro base station 352, previously discussed. In the depicted example, the antennas in the set A (302) are used to transmit the common reference signal and the broadcast channel of the cell. The antennas in the set B (304) are not used for CRS transmissions but used for other signals. Depending on the operational status of a cellular network, Set B 304 may be empty, but Set A 302 may not be empty, since the common reference signal and the broadcast channel need to be transmitted. The signals and channels transmitted from the antenna set B 304 are still associated with the cell-id corresponding to the signals transmitted from set A 302. Even though the transmission parameters of the signals and channels transmitted from the antenna set B 304 do not depend on the cell-id, the signal and channels are transmitted to UEs 110 that are associated with the cell of antenna set A 302. In some conditions, the antennas in the sets A and B may transmit nothing during periods of time. However, since the antennas in set A 302 transmit the common reference signal and the broadcast channel regularly, the silent period on the antennas in set A 302 are limited by this period. For the antennas in set B 304, there is no such limitation to the duration of the silent period.

In the case of an LTE network, the set of antennas on which the CRS, the MIB and the SIBs are transmitted is an example of what is called the antenna set A (302) above. Furthermore, the precoding of demodulation reference signals (DM-RS) or user equipment reference signals (UE-RS) based information and reference symbols can map them to antennas that are not at all used for CRS. In other words, the DM-RS can be transmitted from the antennas in set A as well as any other antennas, e.g., from Set B.

In some implementations, if the cell load is low, only one antenna in set A is turned on and set B is configured to have no antennas in it or alternatively antennas in set B could be turned off. This configuration could give a power savings at the node 300, since antennas in set B 304 can be silent for a long time period until network load increases.

In another scenario, e.g., network 350 previously discussed with respect to FIG. 3A, a cell may have many UEs 110 (e.g., greater than 80%) that are capable only of downlink communication based on common reference signals (legacy UEs). Then, it could be beneficial to have a larger antenna set A, to provide transmit antenna diversity and MIMO (multiple-input multiple-output). Depending on the number of legacy UEs and network load in a cell, the network may dynamically assign number of transmission points to the logical grouping of antennas in set A. For example, in some implementations, at 40% use rate, 4 out of 8 possible transmission antennas may be used; at 60%, 6 out of 8 possible antennas may be used and at 80% or above traffic, all 8 antennas available for downlink transmissions, may be used. Hence, the logical grouping of antennas may be dynamically changed to be 4 antennas in Set A and 4 antennas in Set B, to 6/2 in sets A/B to 8/0 in sets A/B, depending on network bandwidth utilization.

Figure 4A:
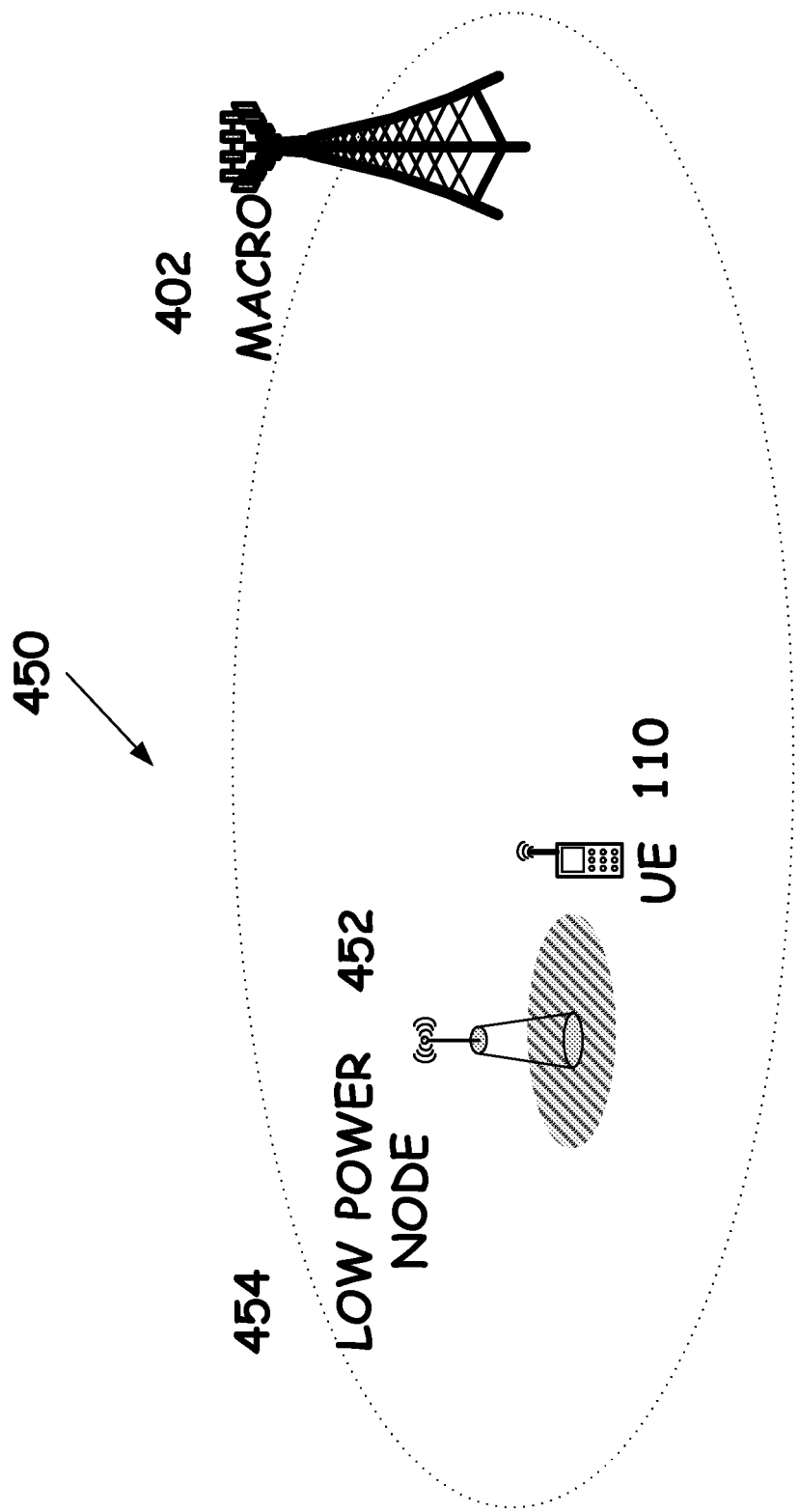
FIG. 4A depicts a cellular network that includes a macro base station and a micro base station.

FIG. 4A shows an example of a wireless network 450 in which different downlink transmission antennas of the cellular network node are not all co-located at the same location but at different base stations at different locations. For example, downlink transmission points may be available at the macro base station 402 and a low power node (LPN) or micro base station 452 to serve UEs 110 in the same cell 454.

A legacy UE 110 operating in the network 450 may not be able to benefit from the LPN 452 and may still look to macro base station 402 for receiving common reference signal and downlink data transmissions. A newer UE 110 may be able to operate either in a mode in which it can receive data using common reference signal or in a mode in which it can receive data using UE-RS. When receiving using UE-RS, the UE 110 may be able to receive data transmissions from LPN 452.

In one implementation with non-co-located antennas, such as depicted in FIG. 4A, the different antennas use significantly different transmit powers. Such an implementation is an example of a heterogeneous network (HetNet). For example, a macrocell base station that typically provides wireless services to a wider geographic region than a microcell, which typically provides wireless service to a smaller geographic area (which often has at least a partial overlap with the macrocell's coverage area). In a HetNet implementation, it could be beneficial to move a remote low-power antenna between the antenna sets, for example, depending on the capabilities of the UEs 110 near the antenna.

In practice, the above scheme could be achieved, for example, by connecting a centralized baseband processing device (e.g., a macrocell base station) with a remote radio unit (e.g., a microcell base station) and antenna using a high-speed interface, such as a fiber-optic cable.

Figure 4B:
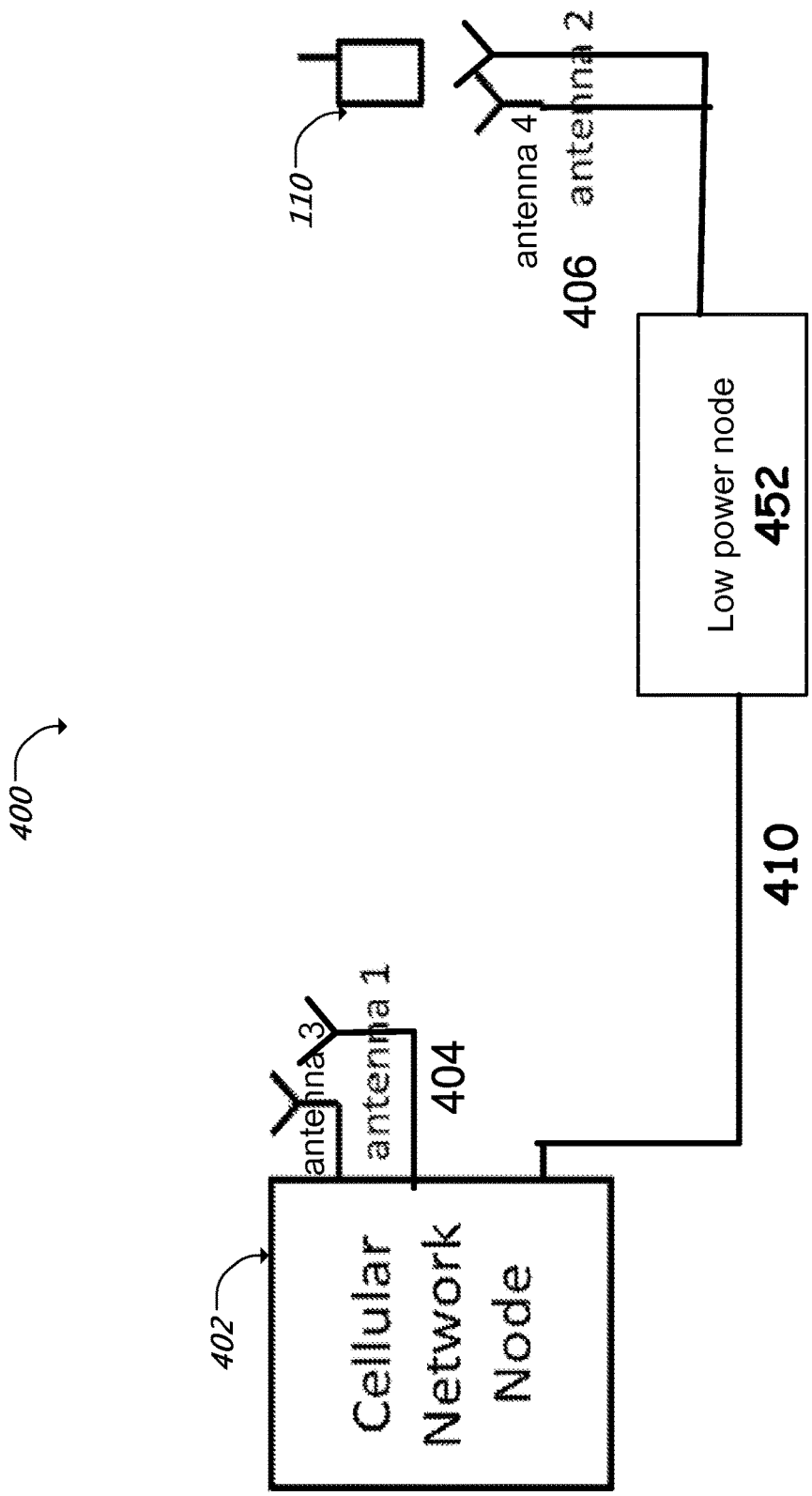
FIG. 4B is a block diagram representation of a cellular network node having non-colocated antennas.

FIG. 4B illustrates a downlink transmission arrangement 400 in which a cellular network node 402 includes antenna 404, representing one or more physical antennas, and 406, representing one or more physical antennas, at two different physical locations as non-co-located antennas. In this example, antennas 404 may correspond to antennas at the macro base station 402 and can transmit with high power whereas antennas 406 that is away from the macro base station 402 may represent antennas at the LPN 452 and can transmit with low power only. The antennas 406 may be under control of the cellular network over a backhaul connection 410, which may be a high speed fiber or coax or gigabit Ethernet link. In order to provide coverage in the cell, at least one transmission point at the node 402, e.g., antenna 1 404 needs to belong to set A, i.e. transmit the broadcast channel and the common reference signal. Antenna 2 406, on the other hand, could belong to either set. If the UEs 110 that are in physical proximity of antenna 2 are capable of downlink communication based on dedicated reference signals, then it is suitable to let antenna 2 belong to set B. If the UEs 110 close to antenna 2 are capable only of downlink communication based on the common reference signal, then it could be suitable to let also antenna 2 belong to set A.

The assignment of antennas to the a first antenna group (set A) and a second antenna group (set B), as described in this document, can be made to depend on network operational status and address various operational issues as further described below.

For example, in some implementations, dynamic antenna assignment can be advantageously used to adapt network bandwidth utilization based on the mix of legacy and newer UEs 110 in the system. For example, referring to FIG. 4A, in some implementations, only antennas at the macro base station 402 may be capable of transmitting broadcast signals at a sufficiently high power level to cover the entire cell 454. Therefore, in some implementations, at least one antenna at the macro base station 402 may always be assigned to set A and configured to transmit common system information, common reference signal and data according to a first format in which the transmission parameters (e.g., modulation and coding index and pre-coding scheme) of the data are derived from the common reference signal. When only legacy UEs 110 are present in the network, all antennas at the macro base station 402 may be assigned to set A and all antennas at the LPN 452 may be assigned to set B and turned off or alternatively not assigned to set B and turned off. It is also to be noted that UEs 110 that can receive data using transmission parameters derived from either common reference signals or dedicated reference signals can advantageously be controlled to operate in one mode or the other, i.e., using common or dedicated reference signals, depending on their location and available network bandwidth. For example, a network may become aware of a UE's capabilities during admitting the UE to the network, e.g., based on the UEs revision number. Thereafter, the network may control the UE to use common reference signal based data transmissions when the traffic in the network is light or the UE is close to the macro base station. Conversely, when the UE 110 is close to a LPN, the network may instruct the UE 110 to operate using dedicated reference signals.

As the number of newer UEs 110 in the network begins to increase, to the extent that the newer UEs 110 are within the coverage of LPN 452, antennas at the LPN 452 may be dynamically assigned to the second antenna group and configured to transmit data using a format in which data transmission parameters are derived from dedicated reference signal transmissions. However, antennas in the antenna Set B do not transmit either common system information or common reference signals, which are still being transmitted by antenna set A.

In a situation where all UEs 110 in the network are newer UEs, with no legacy UEs present in the network, a minimal number of antennas may be assigned to set A and the remaining antennas assigned to set B. Only antennas in set A may be used to serve data to UEs 110 that are closest to the macro base station 402, using either the common reference signal or the dedicated reference signal. Only antennas in set B may be used to serve data to UEs 110 that are closest to the LPN 452. As the concentration of UEs 110 in the network moves from being closer to macro base station 402 to being closer to LPN 452, more and more antennas may be assigned from set A to set B.

In some implementations, the dynamic antenna assignment may depend on relative network bandwidth utilization in the microcell (by LPN 452 transmissions) or in the macrocell (by macro base station 402 transmissions). For example, when load is light, relatively few antennas (e.g., 4 out of 8) may be assigned to set A and configured to transmit common reference signal, and no or relatively few (e.g., 1 or 2) antennas may be assigned to set B. The remaining antennas may be turned off. As the network load increases, the number of antennas assigned to sets A and B may be dynamically increases, with antenna assignments favoring set A or set B depending on whether more bandwidth "opening up" is to be performed in the macrocell or in the microcell.

FIG. 5 is a flowchart representation of a process 500 of wireless communications. The process 500 may be implemented at a controller, a computer or a processor coupled to a cellular wireless network comprising a cell served by multiple antennas located at one or more base stations configured to provide wireless services to a wireless device in the network.

At 502, a first antenna group is configured to include a first antenna from the multiple antennas, located at one or more base stations, to transmit common system information, a common reference signal, and data according to a first format and a second format to wireless devices in the cell. As previously described, in some implementations, the first antenna group includes at least one antenna operating in high power transmission mode, typically located at the macro base station. In some implementations, the first format uses transmission parameters derived from a common reference signal and the second format uses transmission parameters derived from a dedicated reference signal.

At 504, a second antenna group is configured to include a second antenna, different from the first antenna, to transmit data according to the second format, without transmitting common system information or common reference signals, to the wireless device in the cell. As previously discussed, in some implementations, the first antenna group is operated to provide wireless coverage to a macrocell and the second antenna group is operated to provide wireless coverage to a microcell that occupies a smaller geographic area than the macrocell and overlaps at least partially with the macrocell.

At 506, antennas from the multiple antennas located at the one or more base stations are dynamically assigning, based on a network operational status, to either the first antenna group or the second antenna group. The plurality of antennas may comprise all downlink transmission points (antennas or antenna ports) available to the network, including antennas located at macro base station and at low power nodes in the network. In some implementations, not all antennas may be actively used for transmission at all times. For example, as previously discussed, depending on network data traffic load, some transmission antennas may be turned off, e.g., to save power. These antennas could either be considered to be assigned to the second antenna group and configured to perform no transmissions or could be considered to be unassigned to either the first group or the second group of antennas. As discussed previously, in some implementations, the network operational status includes data traffic load in the macrocell. As discussed previously, in some implementations, the network operational status includes data traffic load in the microcell.

FIG. 6 depicts a block diagram representation of a wireless communication apparatus 600. The module 602 is for configuring a first antenna group to include a first antenna from the multiple antennas located at the one or more stations to transmit common system information, a common reference signal, and data according to a first format and a second format to a wireless device in a cell. The module 604 is for configuring a second antenna group to include a second antenna different from the first antenna to transmit data according to the second format, but no common system information or common reference signals, to wireless devices in the cell. The module 606 is for dynamically assigning, based on a network operational status, antennas from multiple antennas located at the one or more base stations to either the first antenna group or the second antenna group. The apparatus 600 and modules 602, 604, 606 may further be configured to implement some techniques disclosed in the present document.

In yet another method of wireless communications, a first subset of a plurality of antennas is assigned to a first antenna group and a second subset of the plurality of antennas to a second antenna group. The first antenna group is configured to transmit reference signals and data according to a first format (e.g., common reference signal based data transmission parameters) or a second format (dedicated reference signal based data transmission parameters). The second antenna group is initially configured to refrain from transmitting signals (e.g., to save power when network UE occupancy is low). Network bandwidth utilization is monitored. When it is determined that the network bandwidth utilization has reached a pre-determined threshold, the second antenna group is turned on to transmit signals according to a second format (e.g., data transmissions based on dedicated reference signals).

A wireless communication system includes a macrocell base station located at a first location to provide radio coverage over a first area and comprising a first set of transmission points configured to transmit data using transmissions parameters derived from a common reference signal transmitted at a first power level (e.g., maximum power or a nominal pre-defined power) and a microcell base station located at a second location separated from the first location to provide radio coverage over a second area that is at least partially within the first area, the microcell base station comprising a second set of transmission points configured to transmit data using a user-equipment specific reference signal transmitted at a second power level lower than the first power level. As previously discussed the microcell base station may operate at a power level that is lower (e.g., by 20 dB) than that of the macro base station. The transmission parameters can be derived using one of many ways, including transmission of a channel quality report from the receiving node to the base station and the adjustment of transmission parameters based on the report. The macrocell base station and the microcell base stations are further configured to transmit using a same cell identification of a radio cell that corresponds to both the first and second areas. The second set of transmission points is turned on or off during operation depending on: (a) network bandwidth utilization, or (b) presence, in the microcell coverage area, of user equipment compatible with user-equipment specific reference signals.

It will be appreciated that the present document discloses techniques that are useful in addressing downlink transmission point assignment problems that cannot be solved by present day wireless communication networks. In one aspect, the techniques discloses in the present document allow for operation of a wireless network using two or more groups of antenna for transmissions from the network to user equipment, where the mapping between the transmission points (e.g., physical antennas at macro or micro cell base stations) and logical antenna grouping can be dynamically changed based on operational status of the wireless network.

It will further be appreciated that several techniques are disclosed to dynamically assign antenna assignments in a wireless node such as a base station at a macrocell or a microcell. In one exemplary technique, network status, such as data traffic load, is used to dynamically reconfigure transmission antennas used for transmissions in a wireless network.

It will further be appreciated that the disclosed techniques can be used to perform antenna reassignment for transmission, depending on the mix of legacy user equipment that looks for common reference signal and newer user equipment that can operate based on dedicated reference signal transmissions.

The disclosed and other embodiments (e.g., antenna configurators, a dynamic antenna configurator, a macrocell controller, a microcell controller, etc.) and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of wireless communications implementable in a cellular network comprising a cell served by multiple antennas located at one or more base stations configured to provide wireless services to a wireless device in the cell, comprising:
   configuring a first antenna group to include a first antenna from the multiple antennas located at the one or more base stations to transmit common system information, a common reference signal, and data according to a first format and a second format to the wireless device in the cell;
   configuring a second antenna group to include a second antenna different from the first antenna to transmit data according to the second format, without transmitting common system information or common reference signals, to the wireless device in the cell; and
   dynamically assigning, based on a network operational status, antennas from the multiple antennas located at the one or more base stations to either the first antenna group or the second antenna group.

2. The method recited in claim 1, further comprising:
   using one or more antennas of a macro base station in the cell as the first antenna group to provide wireless coverage to a macrocell covered by the macro base station; and
   using one or more antennas of a micro base station in the cell operating at a power level lower than the macro base station as the second antenna group to provide wireless coverage to a microcell that occupies a smaller geographic area than the macrocell and overlaps at least partially with the macrocell.

3. The method recited in claim 1, wherein the network operational status includes at least one of: whether or not legacy mobile stations incapable of using the second format are present in the microcell, data traffic load in the macrocell and data traffic load in the microcell.

4. The method recited in claim 1, wherein the first format uses transmission parameters derived from a common reference signal and the second format uses transmission parameters derived from a dedicated reference signal.

5. The method recited in claim 1, further comprising:
   using one or more first antennas of a base station in the cell as the first antenna group to provide wireless coverage to the cell; and
   using one or more second antennas from the base station in the cell as the second antenna group to provide wireless coverage to the cell.

6. A wireless communications apparatus, comprising:
   a first antenna configurator that configures a first antenna group to include a first antenna from the multiple antennas located at one or more base stations to transmit common system information, a common reference signal, and data according to a first format and a second format to the wireless device in the cell;
   a second antenna configurator that configures a second antenna group to include a second antenna different from the first antenna to transmit data according to the second format, without transmitting common system information or common reference signals, to the wireless device in the cell; and
   a dynamic antenna assignor that dynamically assigns, based on a network operational status, antennas from the multiple antennas located at the one or more base stations to either the first antenna group or the second antenna group.

7. The apparatus recited in claim 6, further including:
   a macrocell controller that uses one or more antennas of a macro base station in the cell as the first antenna group to provide wireless coverage to a macrocell; and
   a microcell controller that uses one or more antennas of a micro base station in the cell operating at a power level lower than the macro base station as the second antenna group to provide wireless coverage to a microcell that occupies a smaller geographic area than the macrocell and overlaps at least partially with the macrocell.

8. The apparatus recited in claim 6, wherein the network operational status includes one of: whether or not legacy mobile stations incapable of using the second format are present in the microcell, data traffic load in the macrocell and data traffic load in the microcell.

9. The apparatus recited in claim 6, wherein the first format uses transmission parameters derived from a common reference signal and the second format uses transmission parameters derived from a dedicated reference signal.

10. The apparatus recited in claim 6, wherein:
the first configurator is further configured to use one or more first antennas of a base station in the cell as the first antenna group to provide wireless coverage to the cell; and
the second configurator is further configured to use one or more second antennas from the base station in the cell as the second antenna group to provide wireless coverage to the cell.

* * * * *